United States Patent [19]

Arimoto et al.

[11] Patent Number: 5,012,472
[45] Date of Patent: Apr. 30, 1991

[54] DYNAMIC TYPE SEMICONDUCTOR MEMORY DEVICE HAVING AN ERROR CHECKING AND CORRECTING CIRCUIT

[75] Inventors: Kazutami Arimoto; Kiyohiro Furutani; Koichiro Mashiko, all of Hyogo, Japan

[73] Assignee: Mitsubishi Denki Kabushiki Kaisha, Tokyo, Japan

[21] Appl. No.: 288,218

[22] Filed: Dec. 22, 1988

[30] Foreign Application Priority Data

Dec. 25, 1987 [JP] Japan .................. 62-332542

[51] Int. Cl.$^5$ .............................................. G06F 11/10
[52] U.S. Cl. .................................. 371/40.1; 371/40.4
[58] Field of Search ............... 371/40.4, 40.2, 40.1, 371/40.3, 38.1, 39.1, 37.3; 365/200, 230.04

[56] References Cited

U.S. PATENT DOCUMENTS

| | | | |
|---|---|---|---|
| 4,380,812 | 4/1983 | Ziegler | 371/37.3 |
| 4,692,923 | 9/1987 | Poeppelman | 371/40.4 X |
| 4,703,453 | 10/1987 | Shinoda | 371/40.1 X |
| 4,758,989 | 7/1988 | Davis | 371/40.4 |
| 4,780,875 | 10/1988 | Sakai | 371/40.1 X |

OTHER PUBLICATIONS

H. Davis, "A Word Wide 1Mb ROM with Error Correction", IEEE Int. Solid State Circuit Con., pp. 40-41, 2/1985.

J. Yamada, "Selector-Line Merged Built-In ECC Technique for DRAM's", IEEE Journal of Solid-State Circuits, vol. SC-22, No. 5, pp. 868-873, 10/1987.

*Primary Examiner*—Jerry Smith
*Assistant Examiner*—Robert W. Beausoliel
*Attorney, Agent, or Firm*—Lowe, Price, LeBlanc, Becker & Shur

[57] ABSTRACT

In a memory cell comprising a data cell array and a parity cell array, an error checking-correcting circuit is connected to each of the arrays through a selector. The selector is constituted by transistors connected to each of the bit lines in the memory cell. The number of circuit elements constituting the error checking-correcting circuit corresponds to one-half of the number of the bit line pairs included in the data cell array and the parity cell array. In an error correcting mode, half of the data appeared on the bit line pairs in data cell array and the parity cell array are transferred to the error checking-correcting circuit by the selector, so that the errors are corrected. Thereafter, the data of the remaining half of the bit line pairs are processed in the same manner. Therefore, the number of circuit elements of the error checking-correcting circuit can be reduced compared with the prior art, improving the degree of integration of the device.

18 Claims, 8 Drawing Sheets

DYNAMIC TYPE SEMICONDUCTOR MEMORY DEVICE HAVING AN ERROR CHECKING AND CORRECTING CIRCUIT

BACKGROUND OF THE INVENTION

1. Field of the Invention

The present invention relates to a dynamic type semiconductor memory device and, more specifically, to a dynamic type semiconductor memory device in which the number of circuit elements in an error correcting circuit is reduced.

2. Description of the Background Art

Figure 1:
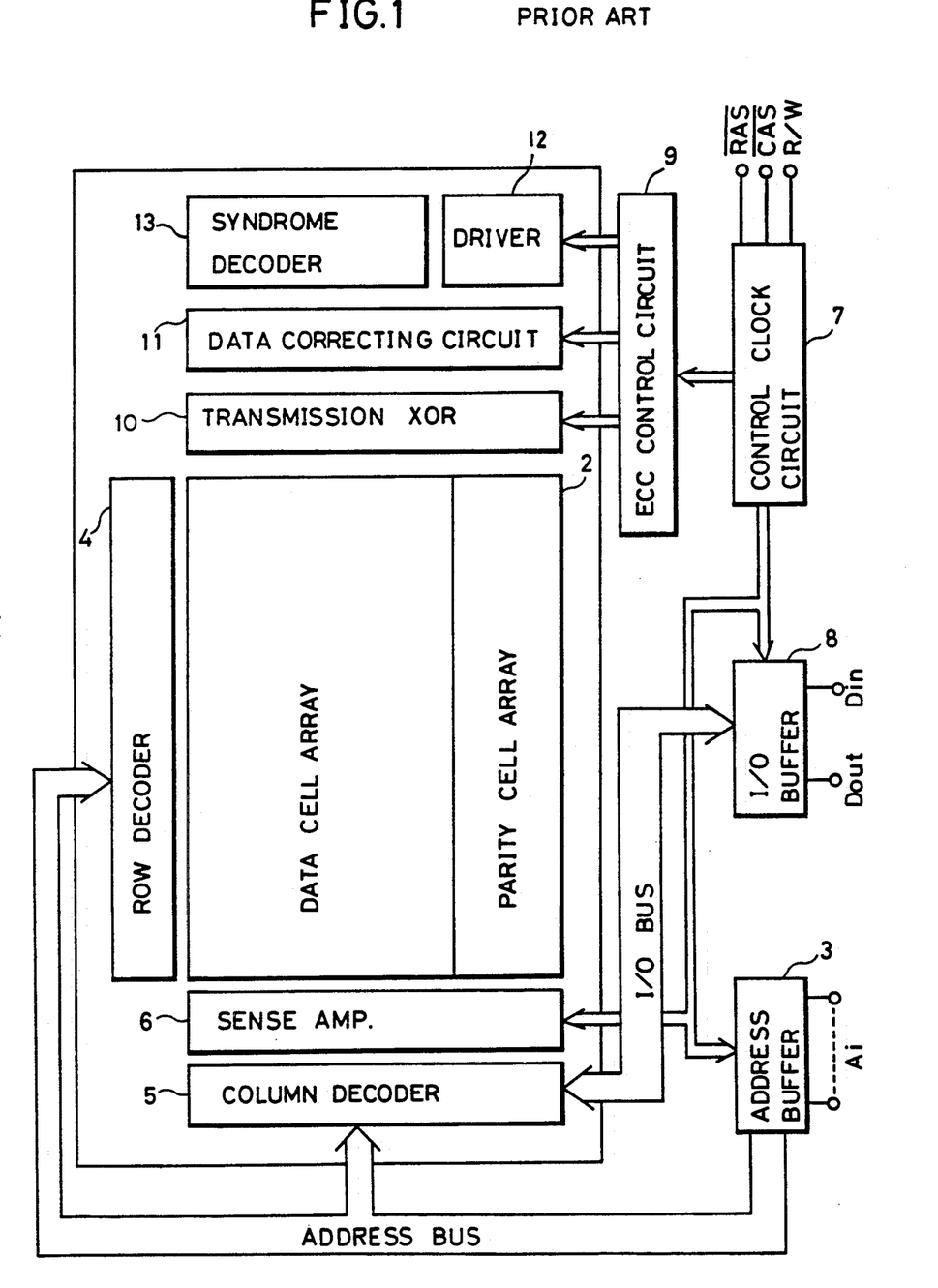
FIG. 1 is a block diagram of a conventional dynamic type semiconductor memory device having an error checking-correcting circuit.

FIG. 1 is a block diagram showing a conventional dynamic type semiconductor memory device (DRAM) having an error correcting circuit.

The structure will be described with reference to the figures.

A memory cell array is divided into two regions, that is, a data cell array 1 storing data information and a parity cell array 2 for checking errors. The peripheral circuits of the memory cell array are: an address buffer 3 for receiving external row address signals and column address signals; a row decoder 4 and a column decoder 5 for applying voltages to word lines and bit lines for designating a specified memory cell by decoding these address signals $A_i$ transmitted through address buses; a sense amplifier 6 for amplifying and reading the signals stored in the memory cell designated by these two decoders; a control clock circuit 7 for receiving external control signals to apply the same to respective portions; an I/O buffer 8 connected to the outside for writing/reading information transmitted through an I/O bus; an error checking-correcting (ECC) control circuit 9 for receiving a signal from the control clock circuit 7 to generate signals for activating an error correcting circuit; a transmission type exclusive OR circuit 10 for calculating a syndrome, which is one of the error correcting circuit; a data correcting circuit 11 for correcting errors, if any, to provide corrected data; a driver 12 for transmitting a syndrome generated by the transmission type XOR 10 to a syndrome decoder 13; and a syndrome decoder 13 for decoding the generated syndrome.

Figure 2:
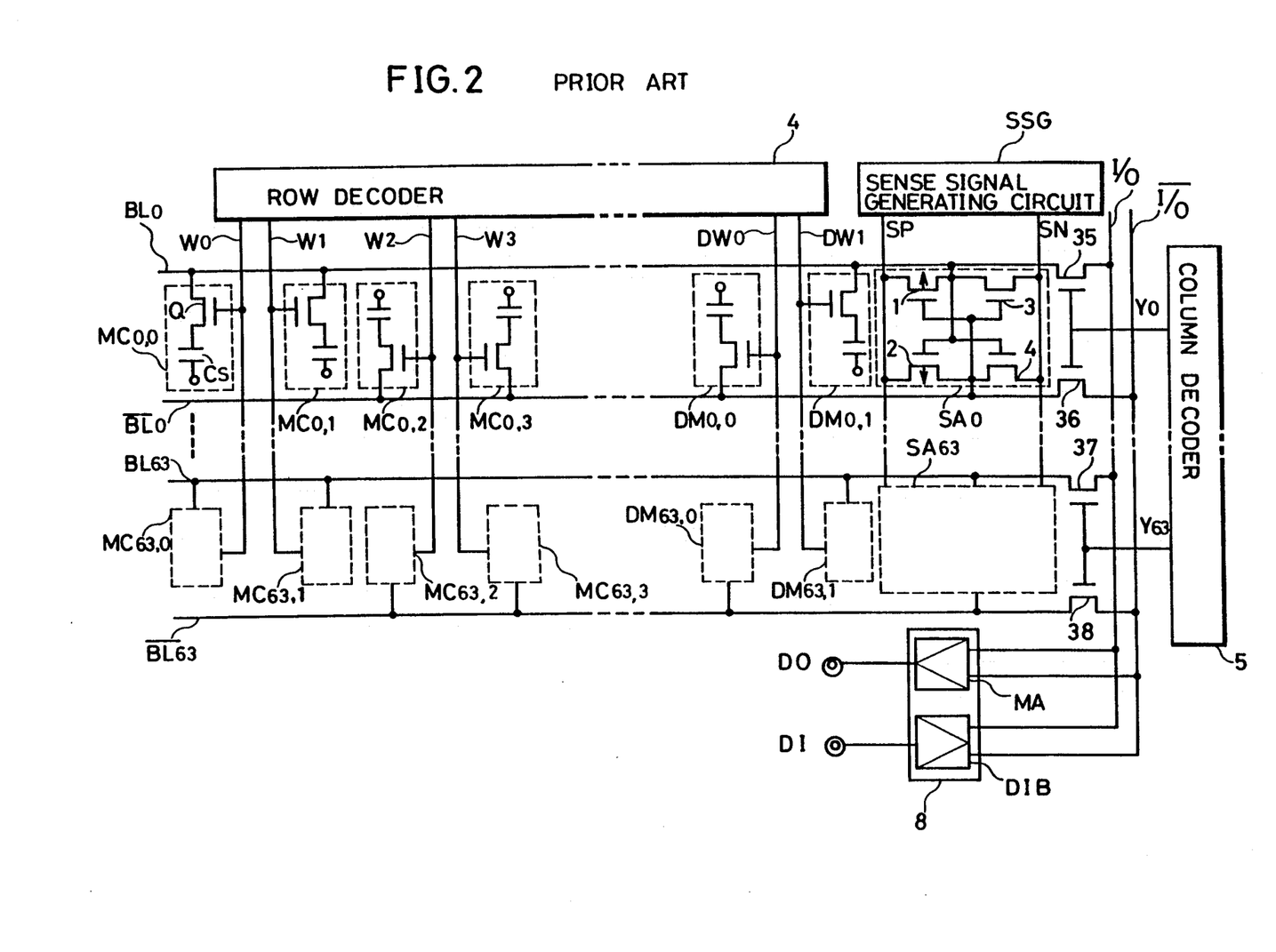
Fig. 2 is a schematic diagram illustrating the structure of the memory cell array of FIG. 1.

FIG. 2 is a portion of a circuit diagram of a memory cell array having 64 rows and 64 columns in a conventional dynamic semiconductor memory disclosed in, for example, Japanese Patent Laying-Open Gazette No. 74535/1976, which is referred to for illustrating the operation of the memory cell array of FIG. 1.

The structure will be described in the following with reference to the figure.

A plurality of memory cells $MC_{0,0}$, $MC_{0,1}$, $MC_{0,2}$, $MC_{0,3}$ ... and dummy cells $DM_{0,0}$ and $DM_{0,1}$ are connected to each of a pair of bit lines $BL_0$ and $\overline{BL_0}$. The memory cell $MC_{0,0}$ comprises an NMOS transistor Q and a capacitance $C_S$. Each of the memory cells and the dummy cells has the same structure. Word lines $W_0$, $W_1$, $W_2$, $W_3$ ... arranged orthogonal to the bit line pair are connected to the gates of the transistors constituting the memory cells. Dummy word lines $DW_0$ and $DW_1$ arranged orthogonal to the bit line pair are connected to the gates of the transistors constituting the dummy cells. The word lines and the dummy word lines are connected to a row decoder 4. A sense amplifier $SA_0$ is connected to end portions of the bit line pair. The sense amplifier $SA_0$ comprises PMOS transistors 1 and 2 and NMOS transistors 3 and 4, with sense amplifier activating signals SP and SN connected to each of these transistors. The sense amplifier activating signals SP and SN are generated from a sense signal generating circuit SSG. End portions of the bit line pair $BL_0$ and $\overline{BL_0}$ are connected to input/output lines I/O and $\overline{I/O}$ through NMOS transistors 35 and 36. A Y signal line $Y_0$ drawn out of the column decoder 5 is connected to the gates of the transistors 35 and 36. Other bit line pairs have the same structure. The input/output lines I/O and $\overline{I/O}$ are respectively connected to a data output main amplifier MA and a data input buffer DIB to exchange information with the outside, the data output main amplifier MA and the data input buffer DIB constituting a pair to form an I/O buffer 8.

The operation will be described in the following.

Let us assume that the memory cell $MC_{0,0}$ is selected in a reading cycle. At that time, the row decoder 4 raises potentials of the word line $W_0$ and the dummy word line $DW_0$, and electric charges which have been stored in respective memory capacitances of the bit line pairs $BL_0$, $\overline{BL_0}$ to $BL_{63}$, $\overline{BL_{63}}$ previously charged to equal potentials are transferred through respective transistors Q. For example, the charges representing information of the memory cell $MC_{0,0}$ are transferred to the line $BL_0$, and the charges of the dummy cell $DM_{0,0}$ are transferred to the bit line $\overline{BL_0}$ so as to generate a reference voltage. Thereafter, the sense amplifier activating signal SN becomes low level and the sense amplifier activating signal SP becomes high level, whereby sense amplifiers $SA_0$ to $SA_{63}$ are activated. Namely, small differences between signal voltages appeared on each of the bit line pairs by the charges representing information transferred to the bit line pairs are sensed and amplified.

Thereafter, the column decoder 5 selects the Y signal line $Y_0$ in accordance with a column address externally applied, whereby the transistors 35 and 36 are turned on. Complementary signal voltages on the bit line pair $BL_0$ and $\overline{BL_0}$ are respectively transferred to the I/O bus line pair I/O and $\overline{I/O}$, amplified by the data output main amplifier MA to be externally outputted as an output data D0. In the writing cycle, data are written into a desired memory cell through reverse operation to the reading cycle. Namely, the level of an input data DI applied from outside of the chip is converted by the data input buffer circuit DIB to be complementary signals, and the signals are transferred to the I/O bus line pair I/O and $\overline{I/O}$. The complementary input data on the I/O bus line pair are transferred to the bit line pair $BL_0$ and $\overline{BL_0}$ by the selection of the Y signal line $Y_0$ by the column decoder 5. The charges representing information are written in the memory cell $MC_{0,0}$ which is at the intersection of the word line $W_0$ selected on that occasion.

Figure 3:
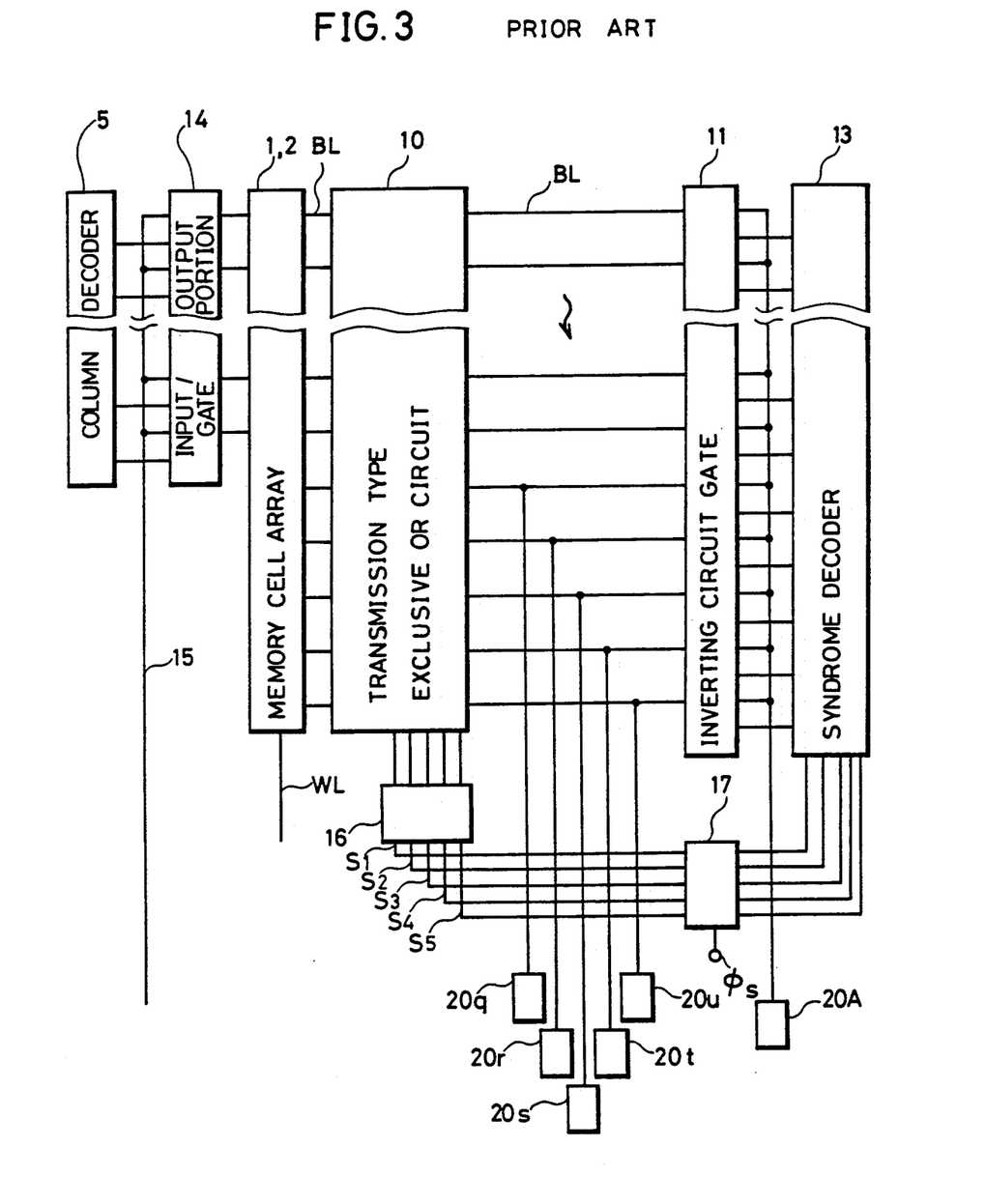
FIG. 3 is a block diagram of the semiconductor memory device for illustrating the operation of the error correcting circuit shown in FIG. 1.

FIG. 3 is a block diagram of a semiconductor memory device having an error checking and correcting function employing Hamming codes, comprising a transmission type exclusive OR circuit disclosed in Conf. IEICE Japan, Conf. Rec., March 1986, pt. 2, pp. 2-244 for illustrating the operation of the error correcting circuit of FIG. 1.

Figure 4:
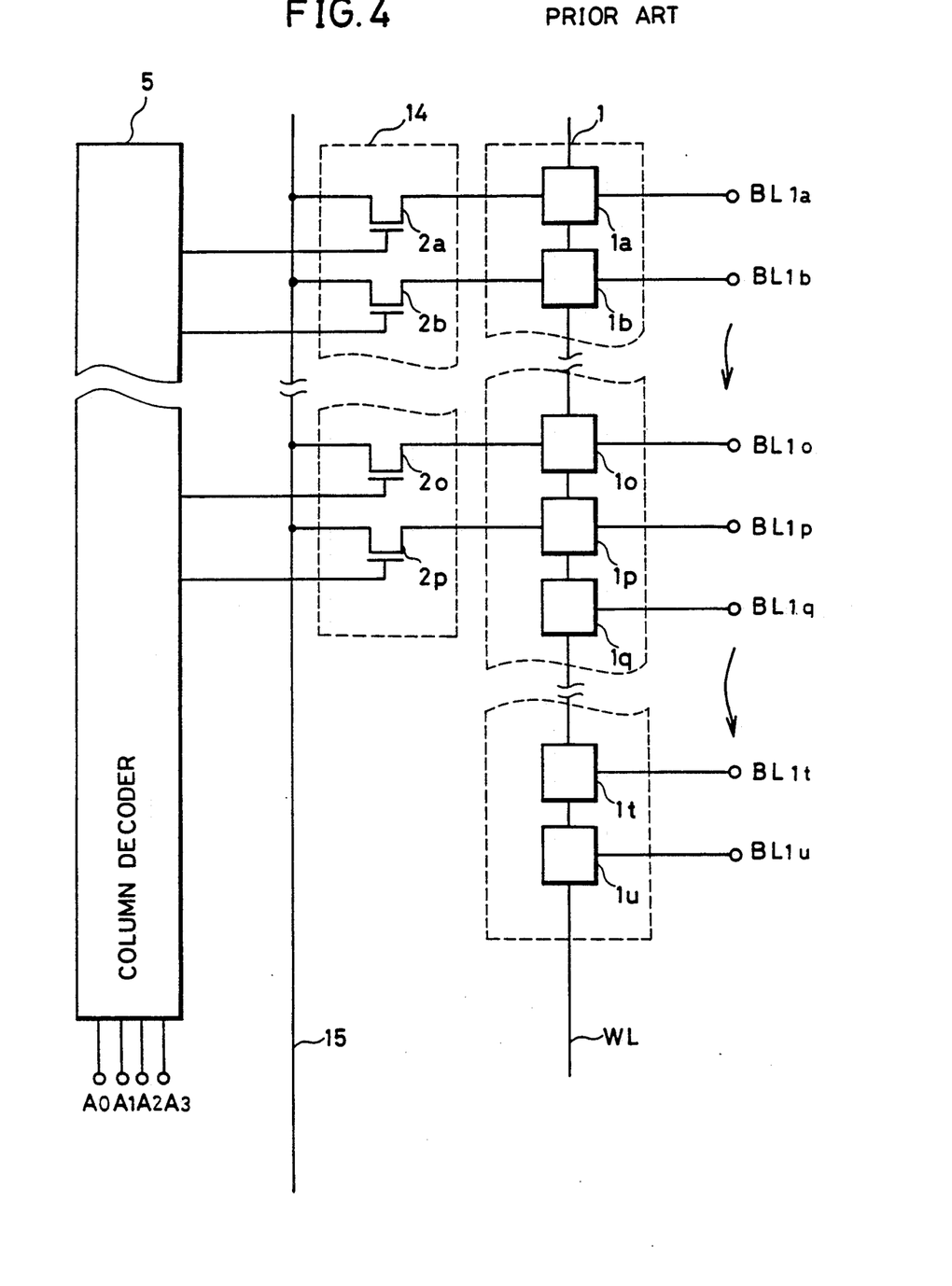
FIG. 4 is a schematic diagram showing components of FIG. 3.

FIG. 4 is a schematic diagram of an input/output line 15, a column decoder 5, an input/output gate portion 14, memory cell arrays 1, 2, bit lines BL and a word line WL shown in FIG. 3.

The operation will be described in the following with reference to these figures.

The operation of each portion in writing data in a memory cell $1a$ will be described as an example. When (0, 0, 0, 0) are inputted as the address signals $A_0$ to $A_3$, a transistor $2a$ in the input/output gate portion 14 connected to the memory cell $1a$ is selected by the column decoder 5, and the transistor becomes conductive. At the same time, the word line WL in the memory cell array 1 is driven to select the memory cell $1a$. The data inputted through the input/output line 15 is written in the memory cell $1a$ through the transistor $2a$. In reading, the data is outputted from the input/output line 15 through the reverse path. The memory cells $1a$ to $1p$ hold 16 bits of information bit data ($X_1 \ldots X_{16}$) and the memory cells $1q$ to $1u$ hold 5 bits of check bit data ($C_1 \ldots C_5$), respectively.

The memory cells constitute a code word C having the following parity check matrix H with the number of information bits being 16 and the number of check bits being 5.

$$H = \begin{bmatrix} 1101101010110101110000 \\ 1011011001101110001000 \\ 0111000111110001100100 \\ 0000111111110000000010 \\ 0000000000001111100001 \end{bmatrix} \quad (1)$$

The parity check matrix H is defined by the transmission type exclusive OR circuit 10 connected in the succeeding stage. The check bit data ($C_1 \ldots C_5$) are previously set to satisfy the following equation in association with the information bit data ($X_1 \ldots X_{16}$).

$$\begin{aligned} H \cdot (X_1 \ldots X_{16}, C_1 \ldots C_5)^T \\ = (0, 0, 0, 0, 0)^T \\ = 0 \end{aligned} \quad (2)$$

A syndrome S is defined by the parity check matrix H and the code word C in the following equation.

$$\begin{aligned} S &= (S_1, S_2, S_3, S_4, S_5)^T \\ &= H \cdot C^T \end{aligned} \quad (3)$$

The checking of data will be described in the following. When there is no error in each data of the code word C comprising 16 bits of information bit data ($X_1 \ldots X_{16}$) and 5 bits of check bit data ($C_1 \ldots C_5$), the syndrome S for the parity check matrix H becomes 0 as represented by the equation (2), whereby it is confirmed that the held data are correct.

When a first bit $X_1$ is erroneously inverted, the syndrome $S_{el}$ of the code word $C_{el}$ having the erroneous data will be not 0 but $S_{el}^T = H \cdot C_{el}^T = (1, 1, 0, 0, 0)^T$, which is the same as the vector of the first column of the parity check matrix H shown in (1). In the similar manner, when the i th bit is erroneously inverted, the syndrome $S_{ei}$ for the code word $C_{ei}$ will be the same as the vector of the i th column of the parity check matrix H. Whether there is an error in the data or not, and if any, which data is the erroneous one can be checked by calculating the syndrome S of the code word C. The syndrome S is calculated in the transmission type exclusive OR circuit 10 in the succeeding stage.

Figure 5:
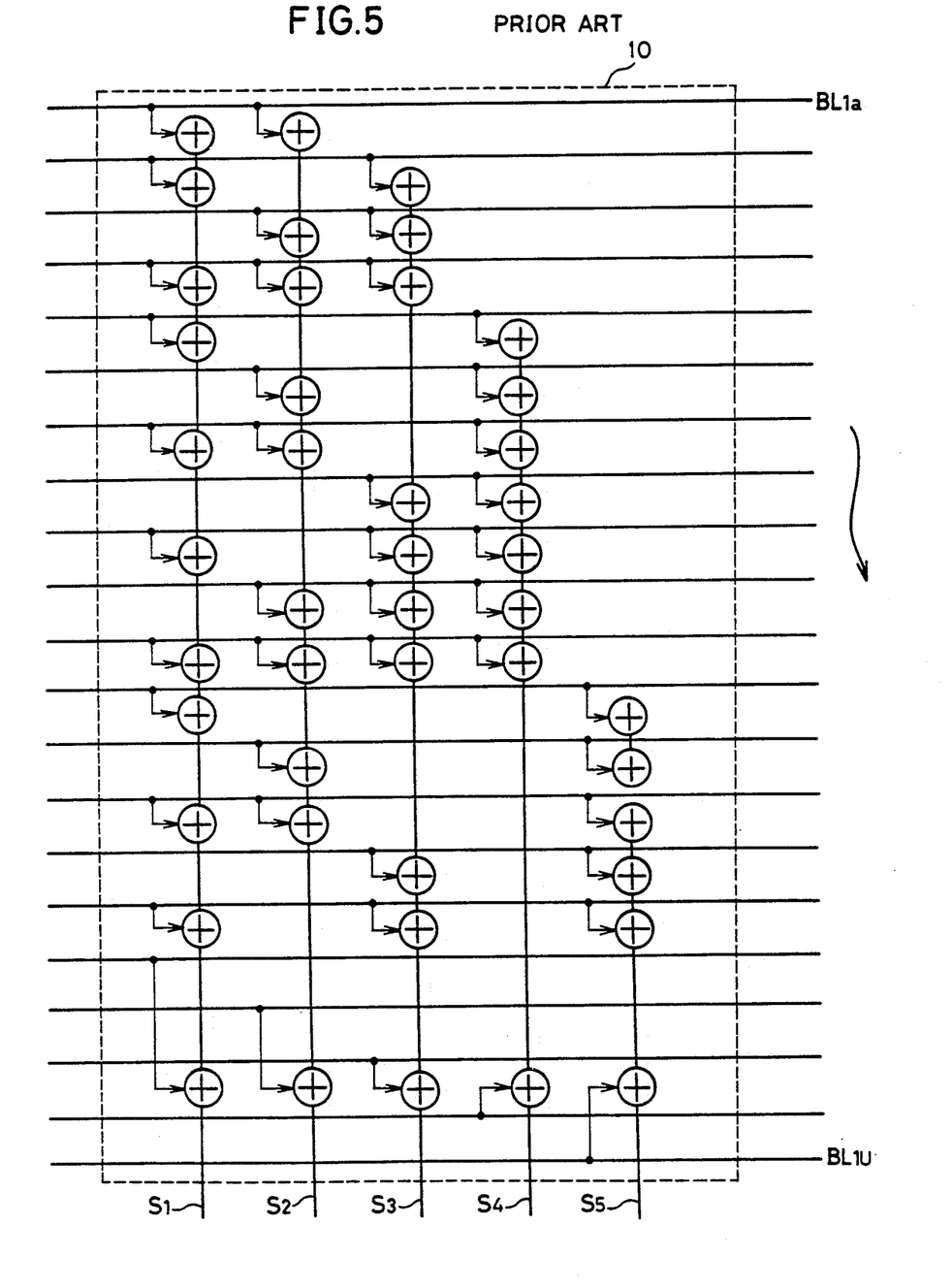
FIG. 5 is a schematic diagram illustrating the operation of the transmission type exclusive OR circuit of FIG. 3.

FIG. 5 is a schematic diagram of the transmission type exclusive OR circuit shown in FIG. 3. The syndrome signals $S_1$ to $S_5$ are calculated by the combination of the exclusive OR of the information bit data ($X_1 \ldots X_{16}$) and the check bit data ($C_1 \ldots C_5$). The transmission type exclusive OR circuit 10 is adapted to satisfy the following equations (4) to (8)

$$X_1 \oplus X_2 \oplus X_4 \oplus X_5 \oplus X_7 \oplus X_9 \oplus X_{11} \\ \oplus X_{12} \oplus X_{14} \oplus X_{16} \oplus C_1 = S_1 \quad (4)$$

$$X_1 \oplus X_3 \oplus X_4 \oplus X_6 \oplus X_7 \oplus X_{10} \oplus X_{11} \\ \oplus X_{13} \oplus X_{14} \oplus C_2 = S_2 \quad (5)$$

$$X_2 \oplus X_3 \oplus X_4 \oplus X_8 \oplus X_{10} \oplus X_{11} \oplus X_{15} \oplus X_{16} \oplus C_3 = S_3 \quad (6)$$

$$X_5 \oplus X_6 \oplus X_7 \oplus X_8 \oplus X_9 \oplus X_{10} \oplus X_{11} \oplus C_4 = S_4 \quad (7)$$

$$X_{12} \oplus X_{13} \oplus X_{14} \oplus X_{15} \oplus X_{16} \oplus C_5 = S_5 \quad (8)$$

The error checking and correcting operation will be described in the following. Referring to FIG. 3, the syndrome signals $S_1$ to $S_5$ are inputted to a buffer circuit 16 to be amplified therein. When the control input $\phi_S$ is set at "H", the transistors in the syndrome gates 17 become conductive, and the syndrome signals $S_1$ to $S_5$ are inputted to the syndrome decoder 13. The syndrome decoder 13 checks whether there is any error in the data, and if any, which of the memory cells contain the erroneous data, in accordance with the bit patterns of the syndrome signals $S_1$ to $S_5$. When there is any error in the data, the syndrome decoder 13 selects a transistor (not shown) in an inversion circuit gate 11 connected to the bit line BL of the memory cell which hold the erroneous data. The selected transistor becomes conductive and connects the memory cell holding the erroneous data to the inversion circuit 20A.

The erroneous data is inverted in the inversion circuit $20a$ to be a correct data. The data is rewritten in the corresponding memory cell through the corresponding transistor (not shown) in the inversion circuit gate 11 and through the corresponding bit line BL.

The rewriting of the check bit data will be describe in the following. When rewriting of the information bit data and so on is carried out, the check bit data ($C_1 \ldots C_5$) must be updated to satisfy the above mentioned equation (2). The check bit data ($C_1 \ldots C_5$) defined by the correct data and which satisfy the equation (2) are formed in inversion circuits $20q$ to $20u$. The correct check bit data ($C_1 \ldots C_5$) are written in memory cells $I_q$ to $I_u$ through corresponding bit lines BL.

The relation between the address signals $A_0$ to $A_3$ and the corresponding memory cells $1a$ to $1p$ and the relation between the syndrome signals $S_1$ to $S_5$ and the corresponding memory cells $1a$ to $1u$ holding erroneous data in the above described structure are shown in Table 1.

TABLE 1

| Memory Cell | $A_0$ | $A_1$ | $A_2$ | $A_3$ | $S_1$ | $S_2$ | $S_3$ | $S_4$ | $S_5$ |
|---|---|---|---|---|---|---|---|---|---|
| 1a | 0 | 0 | 0 | 0 | 1 | 1 | 0 | 0 | 0 |
| 1b | 1 | 0 | 0 | 0 | 1 | 0 | 1 | 0 | 0 |
| 1c | 0 | 1 | 0 | 0 | 0 | 1 | 1 | 0 | 0 |
| 1d | 1 | 1 | 0 | 0 | 1 | 1 | 1 | 0 | 0 |
| 1e | 0 | 0 | 1 | 0 | 1 | 0 | 0 | 1 | 0 |
| 1f | 1 | 0 | 1 | 0 | 0 | 1 | 0 | 1 | 0 |
| 1g | 0 | 1 | 1 | 0 | 1 | 1 | 0 | 1 | 0 |
| 1h | 1 | 1 | 1 | 0 | 0 | 0 | 1 | 1 | 0 |
| 1i | 0 | 0 | 0 | 1 | 1 | 0 | 1 | 1 | 0 |
| 1j | 1 | 0 | 0 | 1 | 0 | 1 | 1 | 1 | 0 |
| 1k | 0 | 1 | 0 | 1 | 1 | 1 | 1 | 1 | 0 |
| 1l | 1 | 1 | 0 | 1 | 1 | 0 | 0 | 0 | 1 |
| 1m | 0 | 0 | 1 | 1 | 0 | 1 | 0 | 0 | 1 |
| 1n | 1 | 0 | 1 | 1 | 1 | 1 | 0 | 0 | 1 |
| 1o | 0 | 1 | 1 | 1 | 0 | 0 | 1 | 0 | 1 |
| 1p | 1 | 1 | 1 | 1 | 1 | 0 | 1 | 0 | 1 |
| 1q | | | | | 1 | 0 | 0 | 0 | 0 |

TABLE 1-continued

| Memory Cell | $A_0$ | $A_1$ | $A_2$ | $A_3$ | $S_1$ | $S_2$ | $S_3$ | $S_4$ | $S_5$ |
|---|---|---|---|---|---|---|---|---|---|
| 1r |   |   |   |   | 0 | 1 | 0 | 0 | 0 |
| 1s |   |   |   |   | 0 | 0 | 1 | 0 | 0 |
| 1t |   |   |   |   | 0 | 0 | 0 | 1 | 0 |
| 1u |   |   |   |   | 0 | 0 | 0 | 0 | 1 |

The semiconductor memory device having the above structured error correcting circuit is not preferable in improving the degree of integration of the device, since each bit line in each bit line pair must be connected to the exclusive OR circuit 10. Namely, the number of circuit elements for the error checking-correcting circuit must be equal to the number of bit line pairs in the memory cell array.

SUMMARY OF THE INVENTION

One object of the present invention is to improve the degree of integration of a semiconductor memory device having an error checking correcting circuit.

Another object of the present invention is to effectively carry out error checking operation of the semiconductor memory device having the error checking correcting circuit.

In order to solve the above described problems, the semiconductor memory device of the present invention with error correcting means incorporated in the memory cell array comprises a plurality of bit line pair groups, error correcting means and switching means. Each of the bit line pair groups comprises at least one bit line pair. The error correcting means comprises circuit elements whose number corresponds to the maximum among the numbers of the bit line pairs included in respective bit line pair groups. The switching means controls connection between the error correcting means and the bit line pairs held by each bit line pair group.

The semiconductor memory device structured as described above carries out checking and correcting operation every bit line pair group in the memory cell array, so that the number of circuit elements required for the error correcting circuit can be reduced, improving the degree of integration of the device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 6:
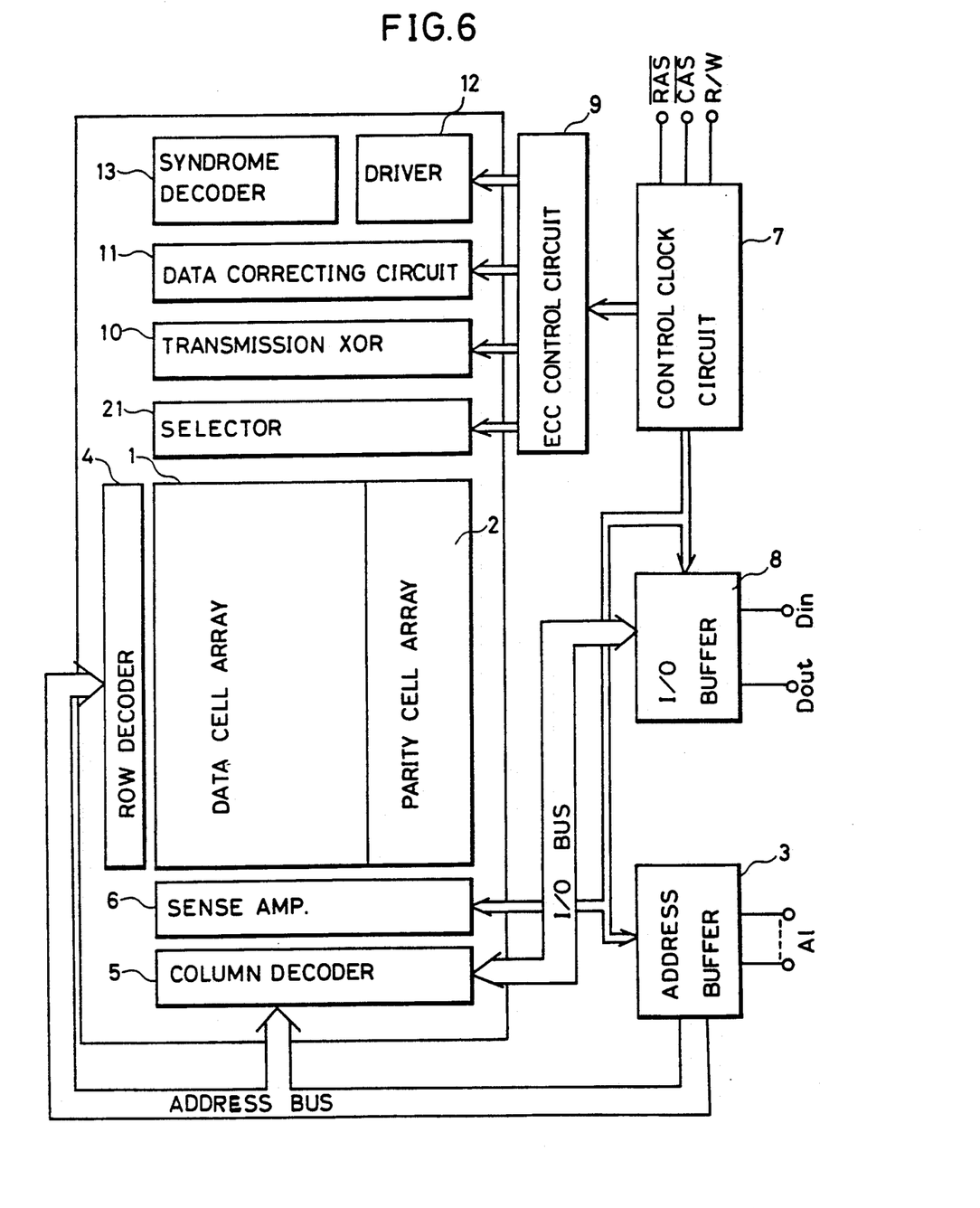
FIG. 6 is a block diagram showing a structure of a dynamic type semiconductor memory device having an error checking-correcting circuit in accordance with one embodiment of the present invention.

FIG. 6 is a block diagram showing a structure of the dynamic type semiconductor memory device having an error checking-correcting circuit in accordance with one embodiment of the present invention.

The structure of this block diagram is the same as that of the conventional semiconductor memory device shown in FIG. 1 except that a selector 21 is provided between the memory cell array and the error checking-correcting circuit. The selector 21 receives signals from an ECC control circuit 9 to control connections between the transmission type exclusive OR circuit 10 and the data cell array 1 and the parity cell array 2 of the memory cell array.

Figure 7:
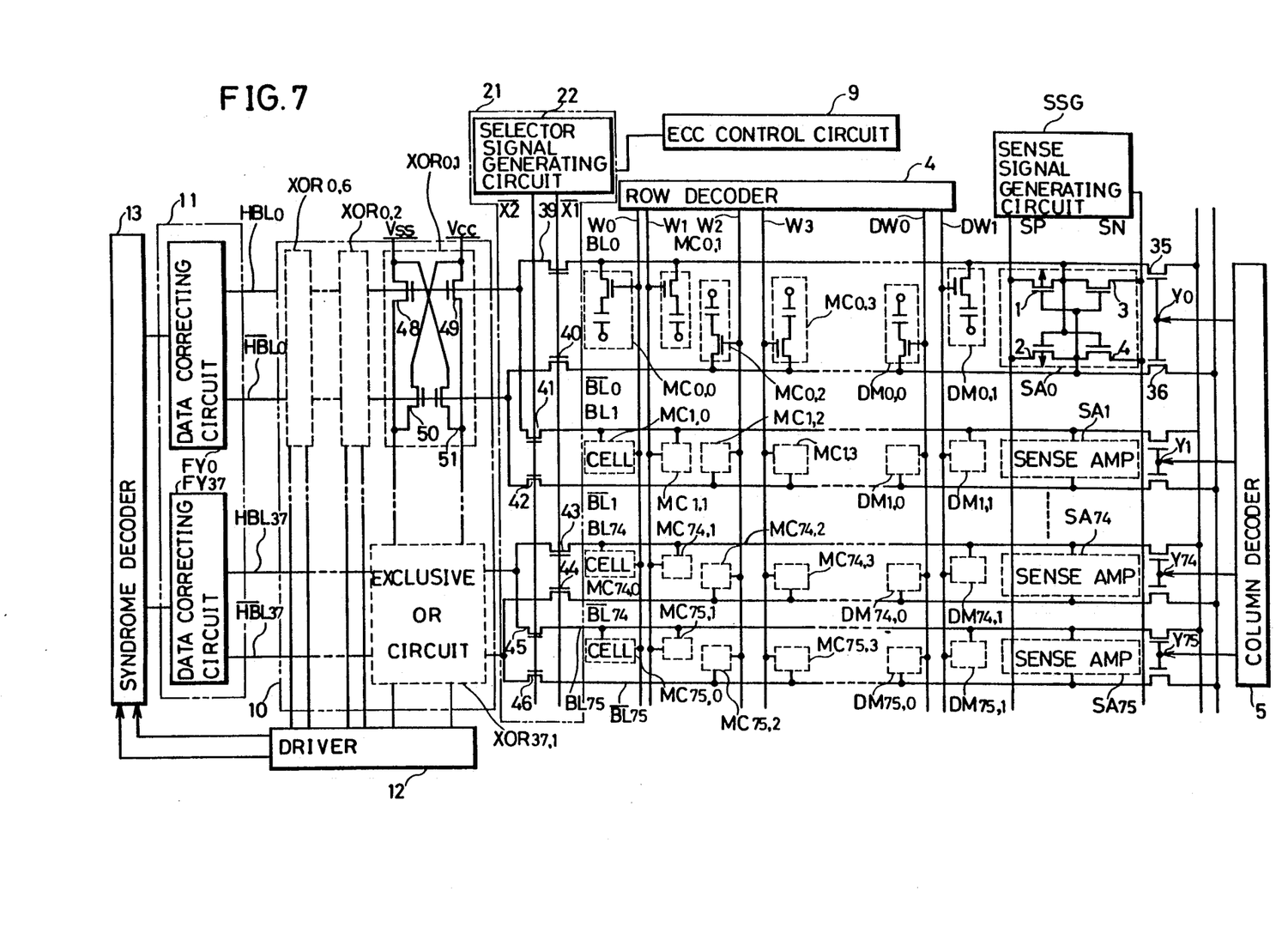
FIG. 7 is a definite circuit diagram of the circuit portions in association with the error checking correction operation of FIG. 6.

FIG. 7 is a specific circuit diagram of the circuit portions of FIG. 6 in association with the error checking-correcting operation.

In the present embodiment, the memory cell array is divided into two blocks, namely, the data cell array 1 and the parity cell array 2, with the data cell array comprising an array of 64 rows×64 columns. In this case, 12 bits of parity cells are required for checking and correcting 1 bit error by means of Hamming code.

Referring to the figure, out of the memory cells $MC_{i,j}$, the memory cells constitute the data cell array, and constitute the parity cell array for checking errors.

Out of the dummy cells, the dummy cells are in association with the data cell array, while are dummy cells in association with the parity cell array.

The sense amplifiers $SA_0$ to $SA_{63}$ and $SA_{64}$ to $SA_{75}$, the Y signal lines $Y_0$ to $Y_{63}$ and $Y_{64}$ to $Y_{75}$ and the bit line pairs $BL_0$, $\overline{BL_0}$ to $BL_{63}$, and $BL_{64}$, $\overline{BL_{64}}$ to $BL_{75}$, $\overline{BL_{75}}$ are respectively in association with the data cell array and the parity cell array.

The error checking·correcting circuit is based on the exclusive OR circuit XOR 10 comprising transistors 18 to 21, and it constitutes the parity check matrix (H matrix) employed for error checking utilizing the Hamming code described in the foregoing. In FIG. 7, a parity check matrix is formed with 32 data bits and 6 check bits. The selector 21 comprises a selector signal generating circuit 22 responsive to a signal from the ECC control circuit 9 to apply control signals $\overline{X1}$ and $\overline{X2}$ to the transistors 39 to 46 and the transistors 39 to 46 serving as switching means in accordance with the applied signals $\overline{X1}$ and $\overline{X2}$. Namely, signals on the bit lines of every other bit line pairs are transferred to the error checking·correcting circuit. In this embodiment, the transistors 39, 40, 43 and 44 are turned on when the signal $\overline{X1}$ becomes H level, while the transistors 40, 42, 45 and 46 remain off. Consequently, bit lines $BL_0$, $\overline{BL_0}$ ... $BL_{74}$, $\overline{BL_{74}}$ are connected to the error checking·correcting circuit. The bit lines $BL_1$, $\overline{BL_1}$ ... $BL_{75}$, $\overline{BL_{75}}$ are not connected to the error checking·correcting circuit. Therefore, the error checking is carried out with 32 data bit data and 6 parity bit data, whereby the number of elements of the error checking·correcting circuit is reduced to ½ compared with the prior art.

As for the 32 data bit data $X_1$ to $X_{32}$ and 6 parity bit data $C_1$ to $C_6$ transferred through the transistors, the parity bit data $C_1$ to $C_6$ are previously set to satisfy the equation $$H \cdot (X_1 \ldots X_{32}, C_1 \ldots C_6)^T = 0^T$$

(T represents transposed matrix). In reading, when the data of $X_i$ is erroneously read, the value of the syndrome $$H \cdot (X_1 \ldots X_{32}, C_1 \ldots C_6)^T = S = (SY_1, SY_2 \ldots SY_6)^T$$

becomes the vector of the i th column of the parity check matrix H. Since the vector of each column of the parity check matrix H is different from each other, the erroneously read data can be identified as $X_i$, when the result of calculation of the syndrome S is equal to the i th column of the parity check matrix H.

The syndrome S ($SY_1$, $SY_2$ ... $SY_6$) provided by the error checking·correcting circuit 10 are transferred to the syndrome decoder 13 through the driver 12. Errors are successively pointed out by the data correcting circuits $FY_0$ to $FY_{37}$ based on the decoded syndrome S, and the data are rewritten.

The data checked and corrected through the above described operation is rewritten in the corresponding bit line pair through the selector 21. The operation of the error checking·correcting circuit is the same as that described with reference to FIGS. 3 to 5.

As for the timing of the error checking and correcting, the checking and correcting may be carried out in a writing cycle of a refresh operation starting with $\overline{CAS}$ before $\overline{RAS}$, or it may be carried out in the normal reading/writing operation. If the bit error is checked during the refreshing operation, there will be no delay in accessing in normal reading. In addition, the state of the stored data is checked regularly and the soft errors can be remarkably reduced. Therefore, the checking during the refreshing operation is preferred.

Therefore, description will be given of a case in which the following operation is carried out in the refresh cycle.

Figure 8:
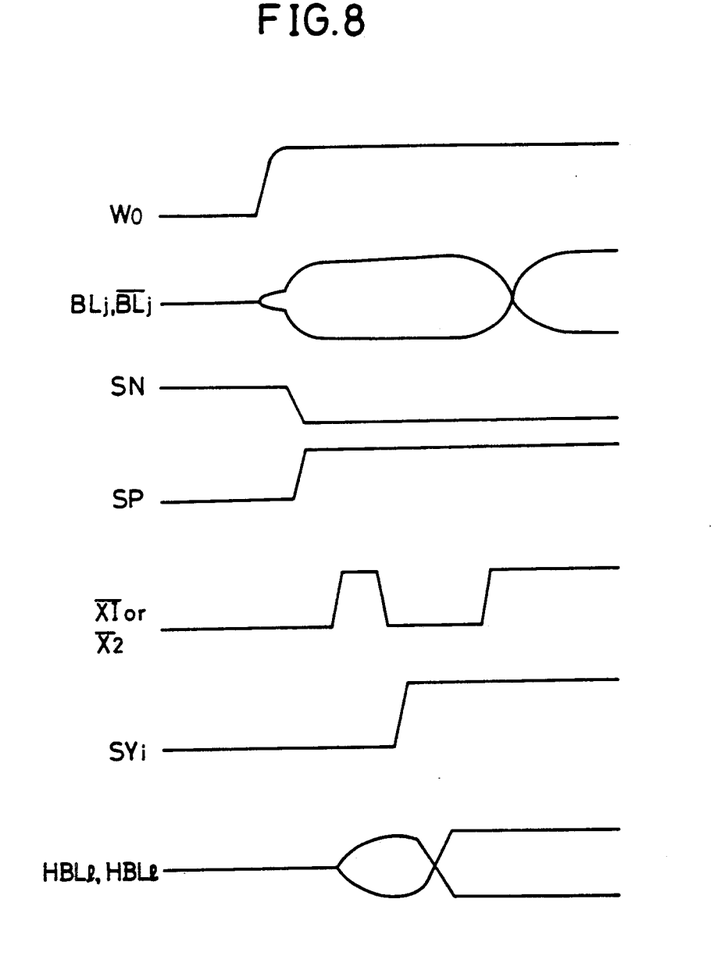
FIG. 8 is a timing chart for illustrating the operation of the circuit shown in FIG. 7.

FIG. 8 is a timing chart for illustrating the operation of the circuit shown in FIG. 7.

Let us assume that an error is generated in the memory cell $MC_{0,0}$, for example.

When the refresh cycle begins in response to the signal change of the $\overline{CAS}$ before $\overline{RAS}$ and the signal on the word line $WL_0$ rises, the data of the memory cells $MC_{0,0}$ to $MC_{75,0}$ are read to respective bit line pairs $BL_{kj}$, $\overline{BL_j}$. The data cells are $MC_{0,0}$ to $MC_{63,0}$ while parity cells are $MC_{64,0}$ to $MC_{75,0}$. 32 bits of data bits of $MC_{0,0}$, $MC_{2,0}$, $MC_{4,0}$, ... $MC_{62,0}$ and 6 bits of parity bits of $MC_{64,0}$, $MC_{66,0}$, ... $MC_{75,0}$ are the objects of the first error checking·correcting operation. The data of other memory cells are in the normal refreshing operation in which the data are amplified by the sense amplifiers in accordance with the sense amplifier activating signals SN and SP to be rewritten, as in the prior art.

The transfer of the information of the data contained in these data bits and parity bits which are read on the bit line pairs to the error checking·correcting circuit 10 is controlled by the selector signals $\overline{X1}$ and $\overline{X2}$ generated in the selector signal generating circuit 21. In this example, the signal $\overline{X1}$ rises to the "H" level, while the signal $\overline{X2}$ remains at the "L" level. When the signal $\overline{X1}$ rises, the data on the bit line pairs $BL_0$, $\overline{BL_0}$, $BL_2$, $\overline{BL_2}$, ... $BL_{74}$, $\overline{BL_{74}}$, ... are transferred to the error checking·correcting circuit 10 through the selector 21. The reference characters HBL and $\overline{HBL}$ represent nodes to which the bit line pairs are connected through the selector. The data of the bit line pairs are held on the nodes HBL and $\overline{HBL}$. After the data transfer, the signal $\overline{X1}$ again returns to the low level "L", and the bit line pairs are separated from the nodes HBL and $\overline{HBL}$. Thereafter, the syndrome $SY_i$ generated in the error checking·correcting circuit 10 is transmitted to the syndrome decoder 13 to be decoded, and the error is corrected. The data of the nodes $HBL_0$ and $\overline{HBL_0}$ are inverted and corrected by the data correcting circuit $FY_0$ in the data correcting circuit 11. The data on other nodes $HBL_L$ and $\overline{HBL_L}$ remain as they are. Thereafter, the signal $\overline{X1}$ again rises and the bit line pairs are connected to the nodes HBL and $\overline{HBL}$. Based on the inverted data on the nodes $HBL_0$ and $\overline{HBL_0}$, the data of the bit line pair $BL_0$ and $\overline{BL_0}$ are inverted, and therefore, corrected.

Through the above described operation, the data of the memory cell $MC_{0,0}$ is corrected and rewritten to have the correct data.

Thereafter, the remaining 32 bits of the data bits $MC_{1,0}$, $MC_{0,3}$ ... $MC_{63,0}$ and 6 bits of the parity bits $MC_{65,0}$, $MC_{67,0}$ ... $MC_{75,0}$ become the objects of the error checking and correcting. At this time, the selector signal $\overline{X2}$ generated in the selector signal generating circuit 22 becomes "H" level, while the signal $\overline{X1}$ remains at the "L" level. The error checking-correcting operation is carried out in the similar manner as described above.

Although the error checking of the data bit has been described in the foregoing, the checking and correction of errors in the parity bits are also carried out in the same manner. When the parity bit must be corrected as the data bit has been rewritten, namely, in the writing cycle, the following operation is carried out. The generated syndrome data is transferred to a rewriting driver (not shown), where a prescribed FYP signal is generated. The FYP signal is generated corresponding to a parity bit line pair whose syndrome becomes high level at the time of even parity. Consequently, a prescribe parity bit is provided by rewriting in correspondence with the new data bit pattern.

Meanwhile, when the error checking and correction is carried out in the normal reading cycle, the signals $\overline{X1}$ and X2 from the selector generating circuit 22 are controlled based on the column address on which the reading is to be carried out. More specifically, the bit line pair to be read from must be conducted to the error correcting circuit by turning on the transistor-connected thereto by setting either the selector signal $\overline{X1}$ or $\overline{X2}$ at "H" level. Thereafter, the error is corrected in the similar manner as described above and rewritten to the correct potential of the bit line pair. Therefore, the correct data is read by the I/O line by selecting the bit line pair by means of the column decoder.

Although the data on one bit line pair out of two bit line pairs were the objects of the error checking and correction in the above described embodiment, the data on one bit line pair out of a plurality of bit line pairs may be the objects of the error checking and correction.

Although the selector was formed with NMOS transistors in the above described embodiment, any other switching means can be employed to provide the same effect.

In the above described embodiment, the bit line pairs are divided into two bit line pair groups each having the same number of bit line pairs. However, the number of the bit line pairs in each group may not be equal to each other. In that case, the number of circuit elements included in the error checking-correcting circuit should be in correspondence with the maximum among the numbers of the bit line pairs in respective bit line pair groups. This idea can be applied when the bit line pairs are divided into three or more bit line pair groups.

In the present invention, only the data of one bit line pair out of a plurality (n) of bit line pairs, that is, one bit line pair group out of a plurality of bit line pair groups, are connected to the error checking-correcting circuit through switching means, to carry out the error checking-correcting operation. Consequently, the number of elements required for the error checking-correcting circuit can be reduced to 1/n compared with the prior art, which is advantageous in improving the degree of integration of the device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device having error correcting means incorporated in a memory cell array, comprising:

a plurality of m bit line pair groups, each group having a plurality of n adjacent bit line pairs, wherein m and n are integers greater than 1;

error correcting means having a plurality of m circuit elements for correcting any erroneous potential appearing on a bit line pair; and switching means for selectively connecting each of said plurality of n bit line pairs contained in each of said bit line pair groups to respective ones of said circuit elements of said error correcting means.

2. A semiconductor memory device according to claim 1, wherein said switching means comprises:

a plurality of m times n select gates each connected to a respective one of each of said bit lines constituting all the bit line pairs contained in said bit line pair groups, each of said select gates being opened or closed in accordance with an applied signal;

signal applying means for applying a signal to each of said select gates; and control-means for controlling the opening or closing of said select gates by changing the signal from said signal applying means.

3. A semiconductor memory device according to claim 2 having an error correcting mode, wherein said control means is activated in said error correcting mode.

4. A semiconductor memory device according to claim 3, wherein said error correcting mode is generated in a refresh cycle.

5. A semiconductor memory device according to claim 3, wherein said error correcting mode is generated in a reading cycle.

6. A semiconductor memory device according to claim 3, wherein said control means is also activated in a writing cycle.

7. A semiconductor memory device according to claim 1, wherein said error correcting means comprises:

a syndrome generating circuit for generating a syndrome signal in accordance with a prescribed operation employing Hamming codes responsive to a signal supplied by one of the bit lines selected from each of said bit line pair groups connected to said syndrome generating circuit by said switching means;

a syndrome decoder for decoding the syndrome signal generated by said syndrome generating circuit and, in response, generating a bit line error signal; and a data correcting circuit for inverting a potential of each of the bit lines constituting a bit line pair in response to said bit line error signal.

8. A semiconductor memory device according to claim 1, wherein said memory cell array comprises a data cell array and a parity cell array, and each of said bit line pair groups comprises at least one bit line pair in said data cell array and at least one bit line pair in said parity cell array.

9. A semiconductor memory device having error correcting means incorporated in a memory cell array, comprising:

a plurality of m bit line pair groups each group having n adjacent bit line pair wherein m and n are integers greater than 1;

error correcting means having m circuit elements for correcting an erroneous potential appearing on a bit line pair; and switching means for selectively connecting one bit line pair contained in each of said m bit line pair groups to a respective one of said n circuit elements of said error correcting means.

10. A semiconductor memory device according to claim 9, wherein n=2.

11. A semiconductor memory device according to claim 10, wherein said switching means comprises:

a plurality of select gates each connected to each of the bit lines constituting all the bit line pairs contained in said bit line pair groups, one half of the gates being opened and the remaining half of the gates being closed in accordance with types of signals applied thereto; and signal applying means for applying two signals to each of said select gates.

12. A semiconductor memory device according to claim 11 having an error correcting mode, wherein said switching means is activated in said error correcting mode.

13. A semiconductor memory device according to claim 12, wherein said error correcting mode is generated in a refresh cycle.

14. A semiconductor memory device according to claim 12, wherein said error correcting mode is generated in a reading cycle.

15. A semiconductor memory device according to claim 12, wherein said control means is activated also in a writing cycle.

16. A semiconductor memory device according to claim 9, wherein said error correcting comprises:

a syndrome generating circuit for generating a syndrome signal in accordance with a prescribed operation employing Hamming codes, based on the potential of each of the bit lines of at least one bit line pair connected thereto;

a syndrome decoder for decoding the syndrome signal generated by said syndrome generating circuit; and a data correcting circuit for inverting the potential of each of the bit lines constituting the bit line pair on which an error is generated, based on said decoded syndrome signal.

17. A semiconductor memory device according to claim 9, wherein said memory cell array comprises a data cell array and a parity cell array.

18. A semiconductor memory device having error correcting means incorporated in a memory cell array formed on a common semiconductor substrate, comprising:

a plurality of m bit line pair groups each having n adjacent bit line pairs formed on said semiconductor substrate, wherein m and n are integers greater than 1;

error correcting means formed on said semiconductor substrate at a common end of said m bit line pair groups, said error correcting means having m circuit elements for correcting an erroneous potential appearing on a bit line pair, a pitch of said m circuit elements on said substrate being equal to a pitch of said m bit line pair groups; and switching means for selectively connecting one bit line pair of said n adjacent bit line pairs contained in each of said m bit line pair groups to a respective one of said n circuit elements of said error correcting means.

* * * * *